(12) United States Patent
Ritchy et al.

(10) Patent No.: US 7,890,877 B2
(45) Date of Patent: Feb. 15, 2011

(54) SYSTEMS AND METHODS FOR IMPROVED PORTAL DEVELOPMENT

(75) Inventors: Robert A. Ritchy, Boulder, CO (US); Jeffrey Mueller, Superior, CO (US)

(73) Assignee: Oracle International Corporation, Redwood Shores, CA (US)

(*) Notice: Subject to any disclaimer, the term of this patent is extended or adjusted under 35 U.S.C. 154(b) by 875 days.

(21) Appl. No.: 10/788,247

(22) Filed: Feb. 26, 2004

(65) Prior Publication Data

US 2004/0183831 A1    Sep. 23, 2004

Related U.S. Application Data

(60) Provisional application No. 60/450,389, filed on Feb. 27, 2003.

(51) Int. Cl.
*G06F 3/048* (2006.01)

(52) U.S. Cl. .................. 715/762; 715/751; 715/736; 715/765; 715/853

(58) Field of Classification Search .................. 345/762; 715/765, 853

See application file for complete search history.

(56) References Cited

U.S. PATENT DOCUMENTS

| | | | |
|---|---|---|---|
| 6,684,385 B1* | 1/2004 | Bailey et al. ................. | 717/109 |
| 6,697,825 B1* | 2/2004 | Underwood et al. ........ | 715/530 |
| 7,093,005 B2* | 8/2006 | Patterson .................... | 709/220 |
| 2003/0167315 A1* | 9/2003 | Chowdhry et al. .......... | 709/218 |

* cited by examiner

*Primary Examiner*—Dennis-Doon Chow
*Assistant Examiner*—Anil N Kumar
(74) *Attorney, Agent, or Firm*—Fliesler Meyer LLP

(57) ABSTRACT

A portal can be generated using a portal designer allowing dragging and dropping of components into a display. The dragging and dropping of components can initiate the update of a display, such as a design view and/or a hierarchal display and the update of a portal file. The portal file can be used to generate the portal. The portal designer can include a property editor window for editing a selected component.

46 Claims, 9 Drawing Sheets

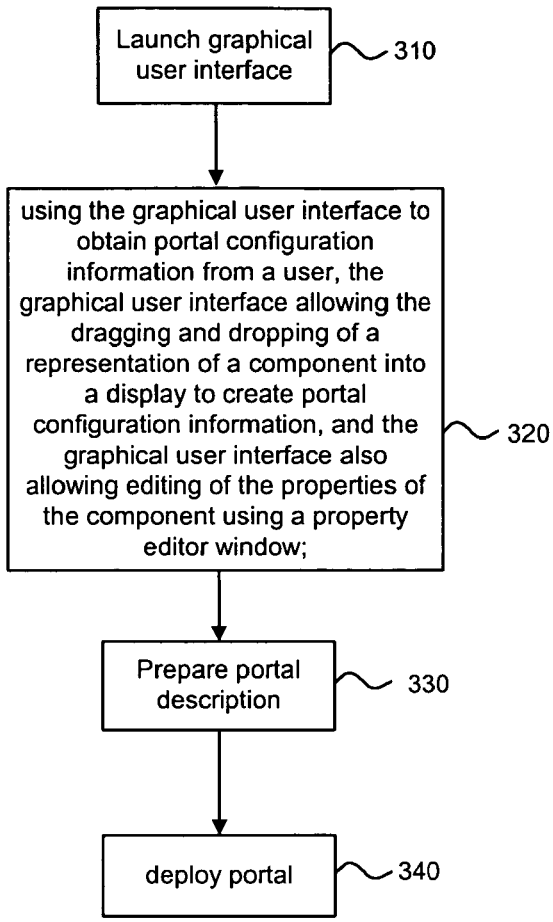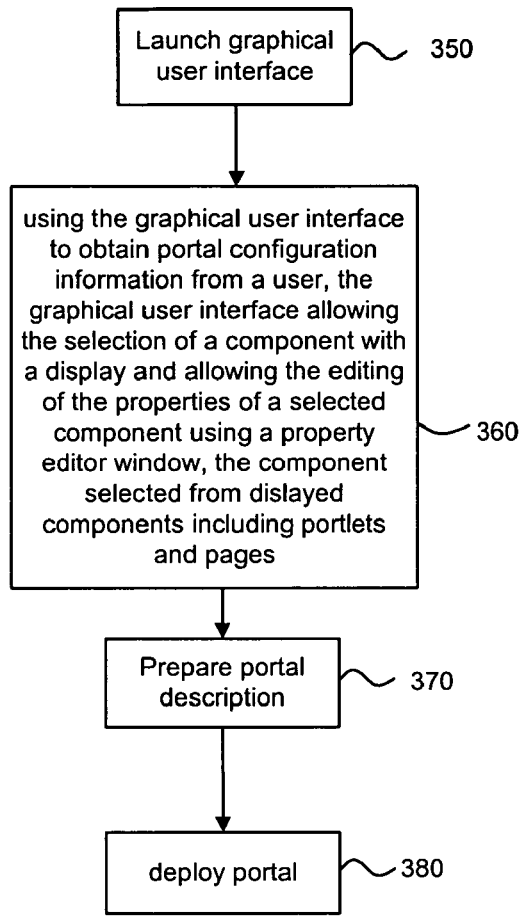
Figure 3A
Figure 3B

SYSTEMS AND METHODS FOR IMPROVED PORTAL DEVELOPMENT

PRIORITY CLAIM

The present application claims the benefit of the filing date of U.S. Provisional Patent Application, SYSTEMS AND METHODS FOR IMPROVED PORTAL DEVELOPMENT, No. 60/450,389, filed Feb. 27, 2003, incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is directed to technology for generating portals.

BACKGROUND

Portals can provide access to information networks and/or sets of services through the World Wide Web and other computer networks. Portals can provide a single point of access to data and applications, making them valuable to developers, businesses, and consumers alike. A portal can present a unified and personalized view of enterprise information to employees, customers, and business partners. In many implementations, portal applications can include web application views designed as a portal.

Portals are capable of presenting multiple web application views within a single web interface. In addition to regular web content that can appear in a portal, portals provide the ability to display portlets (self-contained applications or content) in a single web interface. Portals can also support multiple pages with menu-based or custom navigation for accessing the individualized content and portlets for each page.

The generation of portals, however, can be an involved and cumbersome process that requires considerable development time and effort. In order to create a working portal, an application developer may have to create: a portal definition such as a file including Extensible Markup Language ("XML"); portlet definition files for any portlets associated with the portal; java server pages ("JSPs"); web application descriptors; images such as graphics interchange format files ("GIFs"); deployment descriptors, configuration files, the java archive files ("JAR") that contain the logic and formatting instructions for the portal application; and any other files necessary for the desired portal application. In addition, the developer may have to determine the appropriate directories in which to place each file and then manually move files to appropriate directories.

BRIEF DESCRIPTION OF THE FIGURES

FIGS. 3A and 3B is are flowcharts of methods using a graphical user interface to facilitate the generation of portals in accordance with embodiments of the present invention.

DETAILED DESCRIPTION

Figure 1:
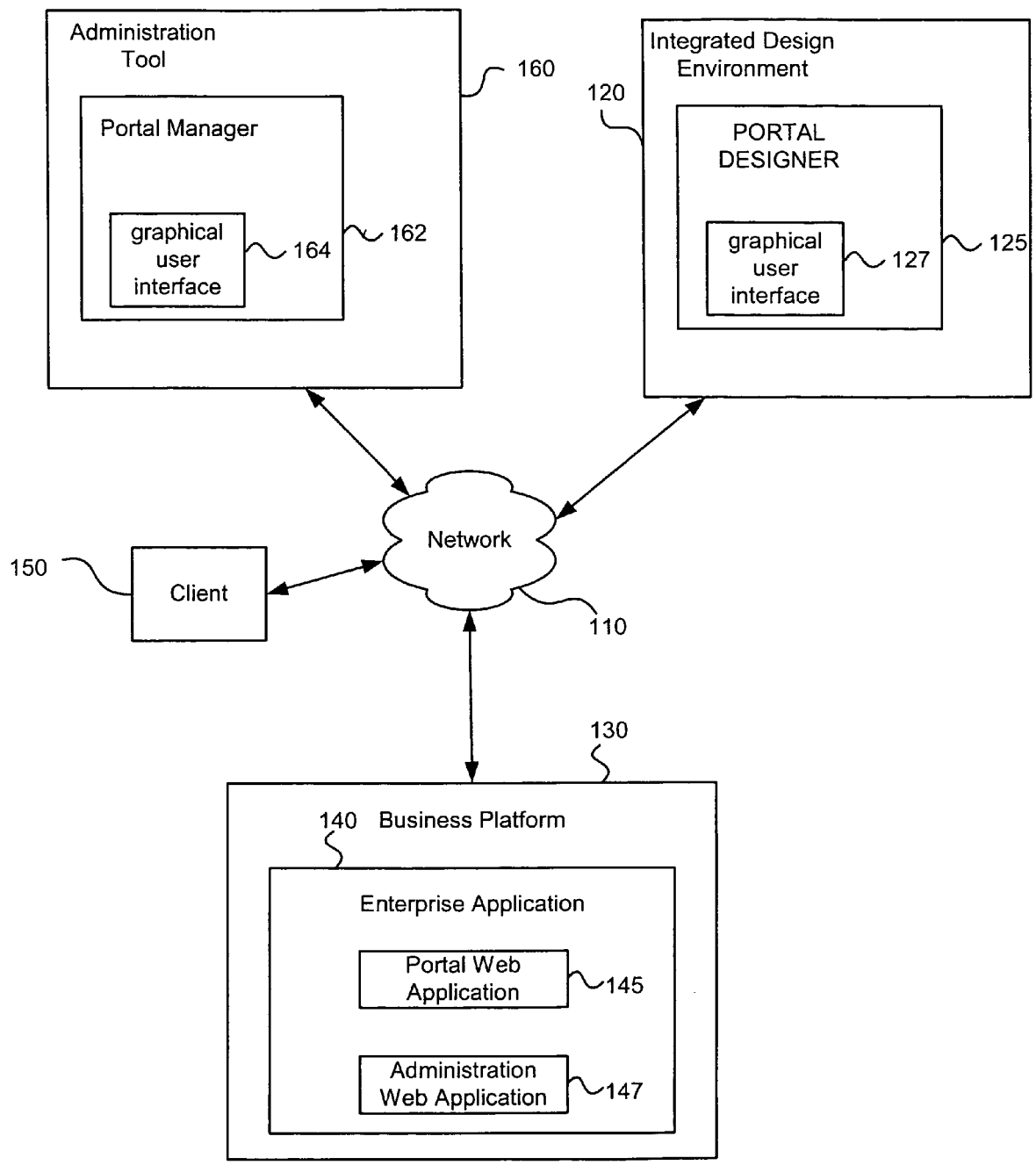
FIG. 1 is a high level block diagram of various software components of a computer network supporting a configurable electronic business system in accordance with an embodiment of the present invention.

FIG. 1 is a high level block diagram of various software components of a computer network supporting a configurable electronic business system in accordance with the present invention.

Business platform 130 is an electronic business platform, such as WEBLOGIC PLATFORM™ 8.1 available from BEA Systems, Inc. of San Jose, Calif. Business platform 130 is capable of hosting one or more enterprise applications 140 which provide services to client 150 over network 110. Enterprise application 140 can include one or more web applications 145. In one embodiment, business platform 130 is implemented on a web server which implements JAVA™ 2 Platform, Enterprise Edition (J2EE), available from Sun Microsystems, Inc. of Santa Clara, Calif.

Integrated design environment 120 is a software component capable of configuring business platform 130. A portal designer 125, including graphical user interface 127, is integrated into integrated design environment 120 and provides for drag-and-drop setup of portals. The portal designer 125 can be used to produce a portal description. The portal description defines a portal and can be used to construct portal views. The portal description can be a portal file, such as a portal file containing portal XML. The portal XML and portal components can be deployed as part of a web application, such as web application 145.

Administration tool 160 can be used to create modified database-based portals. The administration tool 160 can include a portal manager 162 including graphical user interface 164. The administration tool 160 can be used to construct a portal, with an associated portal description, for a user or group of users. The portal description can be modified portal XML stored in a database. In one embodiment, a portal file is obtained by the administration tool, modifications can be made for a user or group of users and the modified portal description can be stored as portal XML in a database. The modified portal XML and portal components can be deployed as part of a web application, such as web application 145. The administration tool 160 can be implemented with administration web application 147.

The client 150 can access the portal across network 110 by using a portal URL. The portal description and components are used to construct the portal for the client 150. In various embodiments, portal designer 125 and administration tool 160 facilitate the generation of portals and/or portlets and the integration of the same.

In various embodiments, data can be synchronized between the integrated design environment 120 or administration tool 160 and business platform 130. As a result, the integrated design environment 120 can operate as a swing application, capable of configuring multiple business platforms, without requiring integrated design environment 120 to be in communication with the business platforms/servers during configuration.

Referring to FIG. 1, client 150 is a software component that requests services provided by application 145. Content provided by application 135 can be displayed to client 150 in a portal-style display. Such a display can employ multiple portal pages and portlets.

Figure 2:
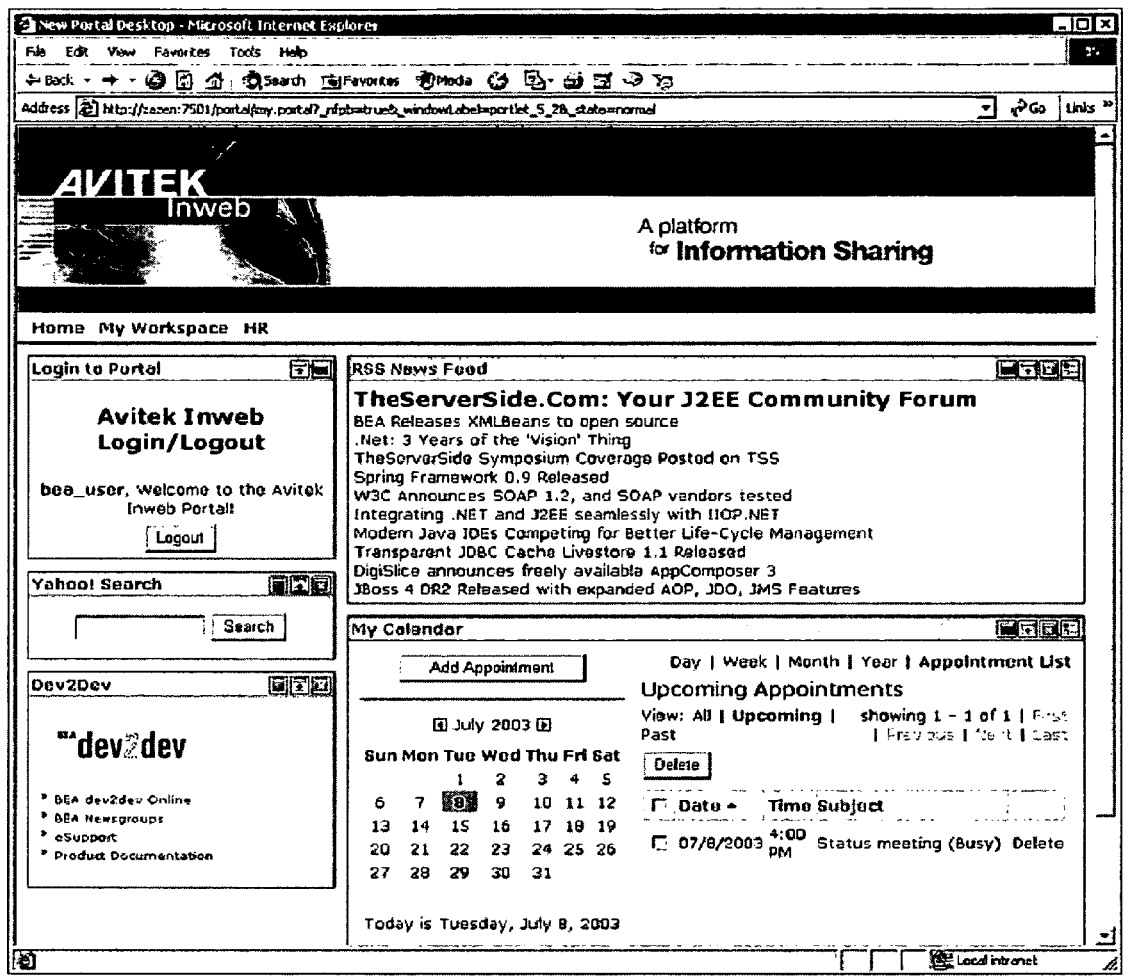
FIG. 2 illustrates a sample screen shot of an application displayed to a client in a portal-style presentation employing portlets.

FIG. 2 illustrates a sample screen shot of an application displayed to a client in a portal-style presentation. Portals are powerful Web sites can give users a single point of access to applications and information in a unified interface. A portal lets users view each application in its own window, called a portlet, and a single browser window can contain multiple portlets. For example FIG. 2 illustrates a portal page containing portlets for logging in, searching, displaying news feeds, and managing appointments with a calendar application.

Portals can provide access to information networks and/or sets of services through the World Wide Web or other computer networks. These networks can range from broad interconnections of computing systems such as the Internet to localized area networks including a few computers located in close geographic proximity such as a home or office. Portal applications can include web application views designed as a portal.

Portlets can be implemented as java server pages (JSPs) referenced by XML-based metadata of the portal descriptor. Portlets can utilize various types of display code to display highly focused information directed to a specific user or user group, having a portal as its container. Portlets can be comprised of portlet components which include portlet attributes (i.e. whether the portlet is editable, floatable, minimizable, maximizable, helpable, mandatory, has defaults minimized, or whether login is required) and portlet layout elements or components (i.e. banner, header, content, and footer sections). In one embodiment, a portlet is defined by a file that contains a portlet's XML-based metadata, which is created and edited by an integrated design environment 120 or administration tool 160. Portlets can also be associated with portlet resource files including skeleton JSPs (one for each portlet layout element) and image files saved to a local file system by portal designer 125 of integrated design environment 120. In one embodiment, portlet resource files do not include the portlet definition itself or a file implementing webflow.

Referring to FIG. 1, integrated design environment 120, administration tool 160, business platform 130, and client 150 can communicate over network 110. Moreover, communication between the components of FIG. 1 can be performed using any of the applicable data formats and/or protocols known in the art including, but not limited to: TCP/IP, XML, and/or SOAP. In the embodiment depicted in FIG. 1, software components 120, 130, and 150 are illustrated as communicating over network 110. In alternate embodiments, some or all of the components can communicate with each other directly (not shown), rather than over network 110.

Portal Generation

FIG. 3A illustrates a flowchart of a method for creating a portlet in accordance with one embodiment of the present invention. In step 310, a graphical user interface is launched. The graphical user interface can be launched in response to a user selection. The graphical user interface can be part of a portal designer, administration tool or other software. The graphical user interface can expose all the portal resources available. The resources can be added to the portal, positioned and modified using the graphical user interface.

Figure 4:
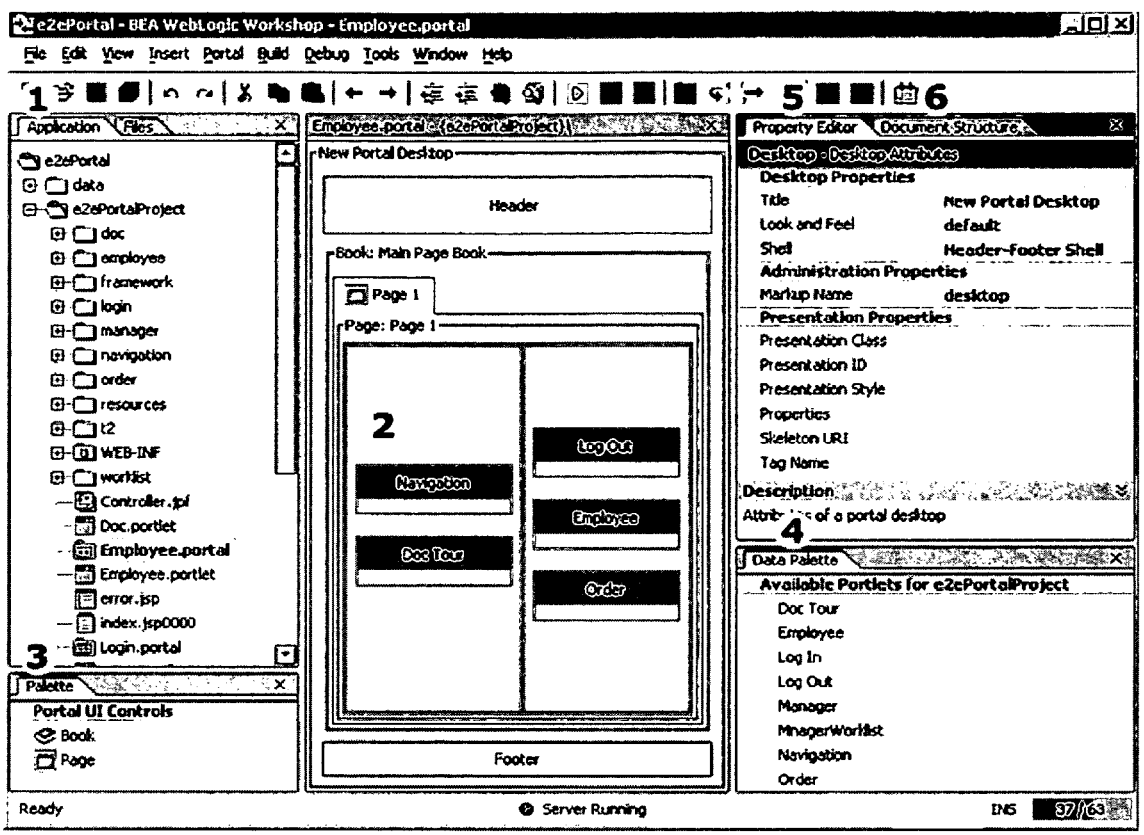
FIG. 4 illustrates a portlet designer of one embodiment of the present invention.

In step 320, portal configuration information is received from user inputs. In one embodiment, the graphical user interface is used to obtain portal configuration information from a user. The graphical user interface can allow dragging and dropping of a representation of a component into a display to create portal configuration information. The representation can be an icon, file folder or the like. The display can be, for example, a design view or a hierarchical display. A design view is a display that gives a graphical indication of all or a portion of the portal components in the portal or page. A hierarchical display, such as a document structure window, is a display that gives a graphical indication of all or a portion of the portal components arranged hierarchically. The representation can be dragged from a palette to the display. A palette is a display of components for use with a portal. For example, the components can be portlets, pages, books or other elements. FIG. 4 illustrates a graphical user interface with a design view and palettes of one embodiment of the present invention.

The graphical user interface can allow editing of the properties of a selected component using a property editor window. For example, the property editor window can be used to modify the title, theme, look and feel and other elements of a component such as a book, page, or portlet. When the user clicks on a representation of a component in a display, a component can be selected. The portal description can be used to find files for component. These component files can be modified by the property editor window.

The configuration information can include position information for a component. For example, the position a portlet is dropped in a design view may relate to the position the portlet will be in the displayed page. In one embodiment, the position information is grid or placeholder location information for a page layout. The layout can define cells. A placeholder can be placed into the cell in an order. Components such as portlets, can be dragged into the design view and placed into a placeholder. The placeholder defines the positioning (up/down, left/right) of the portlets or other components. The layout for a page defines the positioning of the cells in a page and thus the positioning of the placeholder groups of portlets or other components in the page. The drag and drop operation can be used to put a portlet or other component in a specific book page, placeholder and position in the placeholder.

The drag and drop functionality can be implemented in a number of ways. For example, Java 2 supports drag and drop functionality. In Java 2, drag and drop functionality uses an underlying data-transfer mechanism (java.awt.datatransfer) for use with a clipboard. Java 2 defines several classes in package java.awt.dnd. for drag and drop operations.

Looking again at FIG. 3, in step 330, a portal description, such as a portal file and/or portal XML, is prepared. The portal description can be automatically updated upon a graphical user interface operation, such as a drag and drop operation. In one embodiment, the portal file can include XML. The portal file can be used to construct the display, such as the design view and hierarchical display. Alternately, an internal representation can be used construct the display and the portal description.

In step 340, a portal is built. In one embodiment, the portal is built using the portal description. In one embodiment, the portal XML points to the component files, templates, images and other resources used by the portal.

FIG. 3B illustrates a flowchart of a method for creating a portlet in accordance with another embodiment of the present invention. In step 350, a graphical user interface is launched.

In step 360, portal configuration information is received from user inputs. In one embodiment, the graphical user interface allows the selection of a representation of a component in a display. The selection can be done by clicking on a representation of the component in the display. A property editor window allows the editing of the properties of a selected component. The component can be selected from displayed components including portlets and pages. The displayed components can also include the desktop, and books.

In step 370, a portal description, such as a portal file and/or portal XML, is prepared. In step 340, a portal is built. In one embodiment, the portal is built using the portal description. In one embodiment, the portal XML points to the component files, templates, images and other resources used by the portal.

FIG. 4 illustrates a graphical user interface for an exemplary portal designer of one embodiment. Region 1 is an Application Window. The application window can be used to create, view, and edit portal files in portal application projects. The names of portal files end in portal. Region 2 is a design view. Regions 3 and 4 are palettes. Region 3 is a palette for adding books and pages to the portal by dragging components from the Palette window and dropping them onto the Design View canvas. Region 4 is a Data Palette Window. The data palette window allows the addition of portlets to the portal by dragging them from the Data Palette window and dropping them onto the Design View canvas. The portlets can be pre-existing portlets or user designed portlets.

Region 5 is a Property Editor Window. The Property Editor Window allows for the setting of properties for the currently selected portal component, such as the portal look and feel. Users can select a portal component by clicking on it in the Design View canvas or by selecting its name in the Document Structure window. In one embodiment, the Property Editor Window will show selectable features for the currently selected component. The user can use the Property Editor Window to select a feature such as the look and feel, theme or title to modify. Features such as a new "look and feel" or new theme can be selected from a predetermined list. In the example of FIG. 4, a desktop component is selected and the Property Editor Window allows the selection of a title, "look and feel", shell, and presentation properties.

Region 6 is the Document Structure Window. The Document Structure Window shows the hierarchical structure for the portal interface. In one example, a portal component can be selected in the Document Structure window by clicking on it. The portal component is then automatically selected in Design View and you can edit its properties in the Property Editor window. In the example of FIG. 4, the document structure window is hidden behind the property editor window.

Figure 5A:
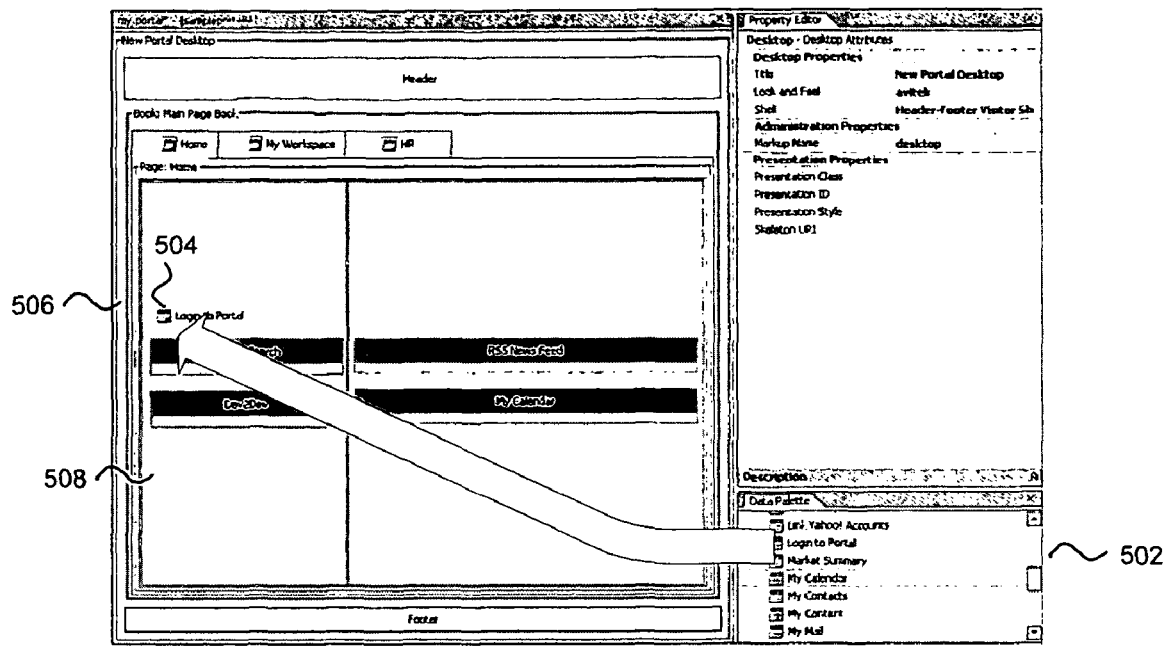
FIGS. 5A and 5B illustrate the dragging and dropping operation in a portal designer of one embodiment of the present invention.
Figure 5B:
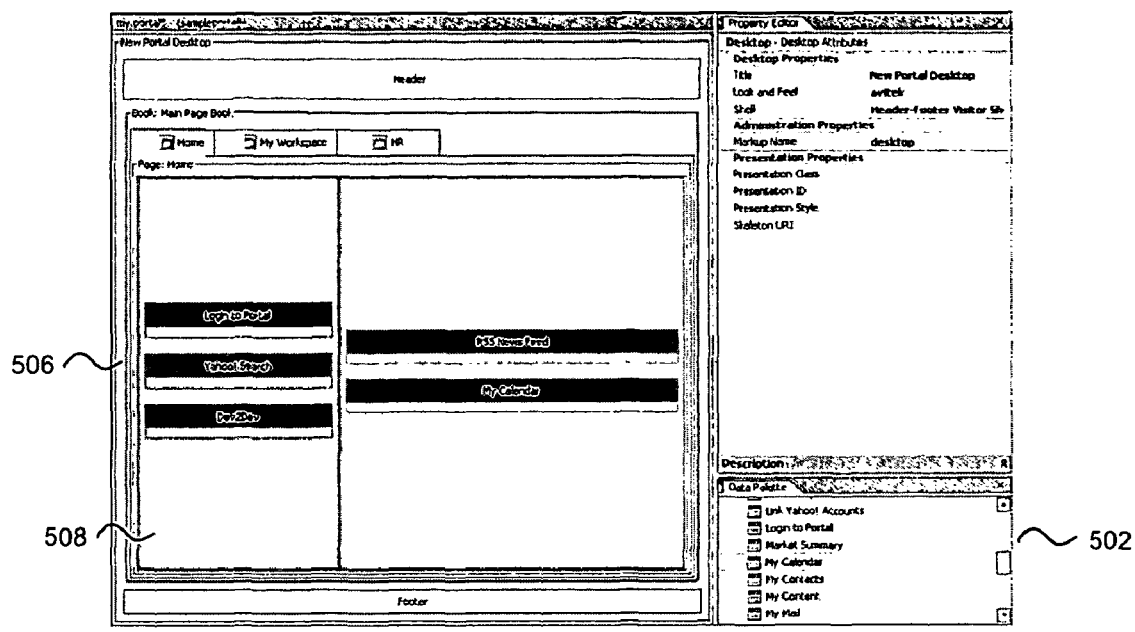

FIGS. 5A and 5B illustrate the use of a Portal Designer of one embodiment of the present invention. Looking at the example of FIG. 5A, the user goes to data palette 502 and drags a representation of a portlet, such as the "login to portal" portlet icon 504, from the data palette 502 into the design view 506. In this example, the representation of the "login to portal" portlet 504 is dragged into the placeholder region 508.

The design view in this example shows a main book including the pages for "home", "my work space" and "HR". The current page being displayed is the "home" page. Dragging and dropping the representation of portlet 504 into the placeholder 508 causes the design view 506 to be updated as shown in FIG. 5B. The location that the representation of the portlet 504 is dropped in the placeholder 508 effects the positioning of the portlet in the display page. Since the icon 504 is dropped above the portlets in the placeholders, this is the position of the portlet in the design view. Alternately, if the portlet in this example would be dropped in between the "Yahoo search" portlet and the "Dev2Dev" portlet then the design view will show the "login to portal" portlet in that middle position. In example of 5A and 5B, the portlets are arranged up/down within a placeholder. The placeholders can also have left/right positioning of portlets, in which case the portlet design display and the produced portal page will show this arrangement. The arrangement of the placeholders which the layout of a page can be controlled by the page layout which can be selectable either at the property editor or by dragging and dropping the initial page lay out from a pallet. Other components that can be dragged and dropped include portlets, pages and books.

Figure 6A:
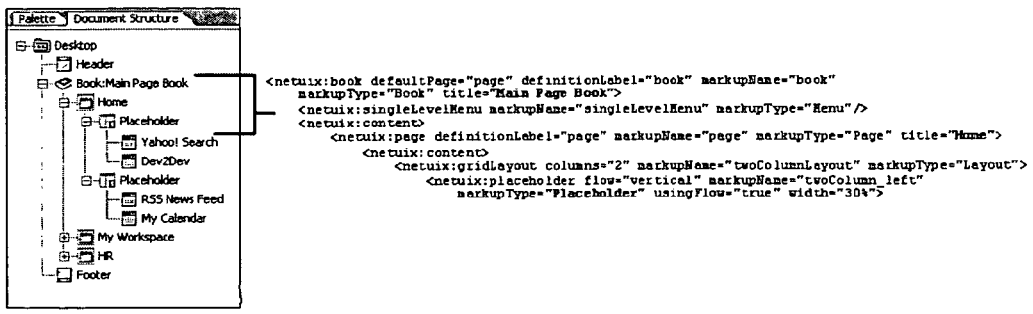
FIGS. 6A and 6B illustrate the updating of the document structure window on one embodiment of the present invention as a result of a drag and drop operation.
Figure 6B:
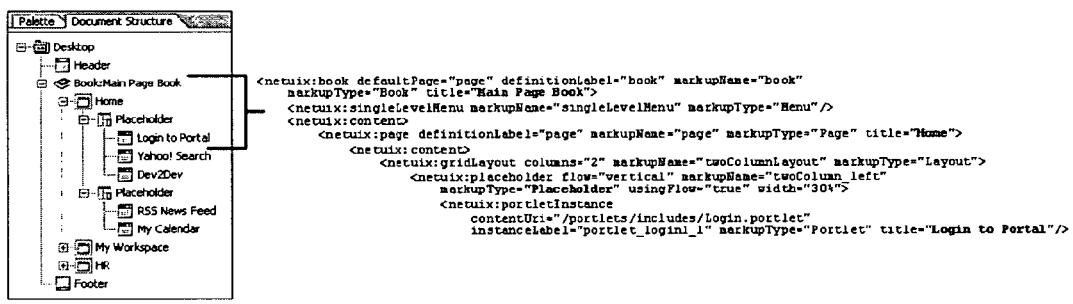

FIGS. 6A and 6B illustrate the effects of dragging and dropping a portlet in the document structure view. As shown in FIG. 6A the components of the document structure view correspond to the design view shown in FIG. 5A. Additionally, the components correspond to the portal XML. The portal XML can be shown in a source view. As shown in FIG. 6B, when the "login to portal" portlet is added to the design view as shown in FIGS. 5A and 5B, the "login to portal" portlet is automatically added to the document view and the XML for this portlet is automatically constructed and added to the portal file.

Figure 7A:
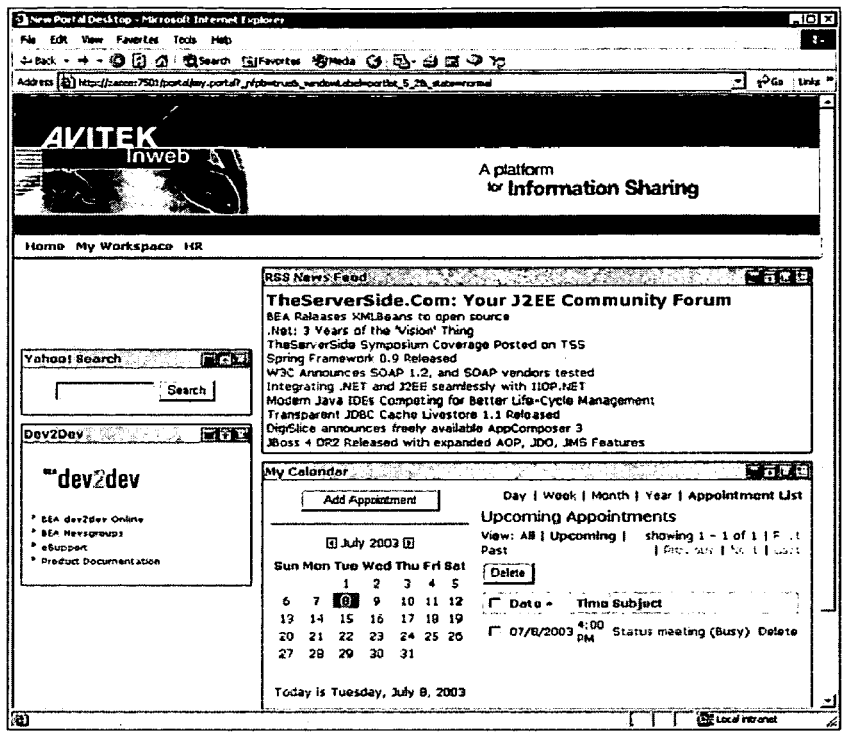
FIGS. 7A and 7B illustrate a constructed portal page before and after the drag and drop operation of FIGS. 5A and 5B.
Figure 7B:
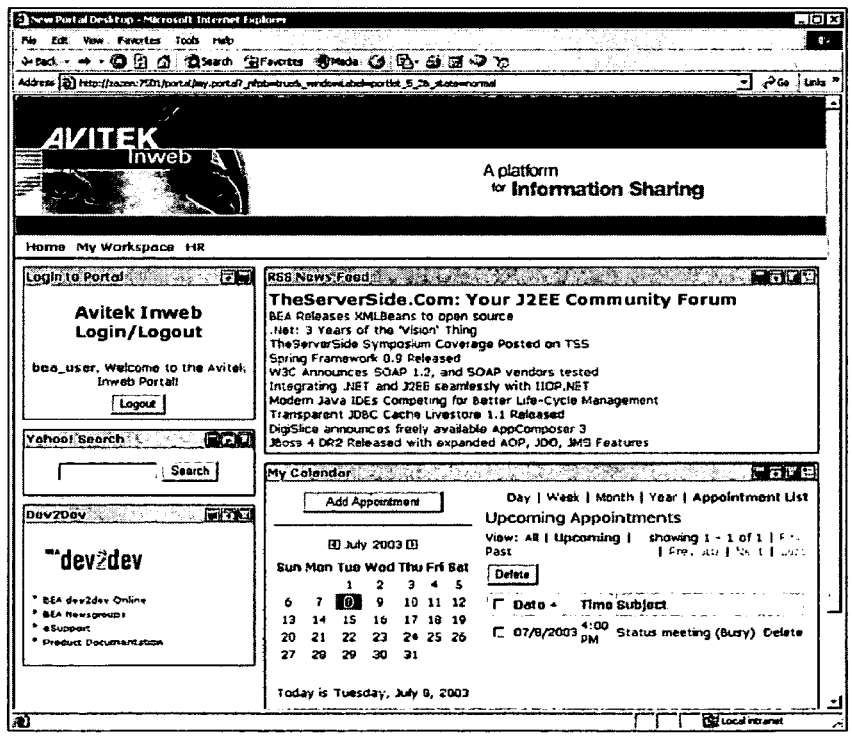

In one embodiment, the component can be manipulated in the document structure display and the design view by dragging and dropping representations of the components. The design view document structure view and portal file can be automatically updated as a result. FIGS. 7A and 7B illustrate the addition of the "login to portal" portlet to the displayed page.

Figure 8:
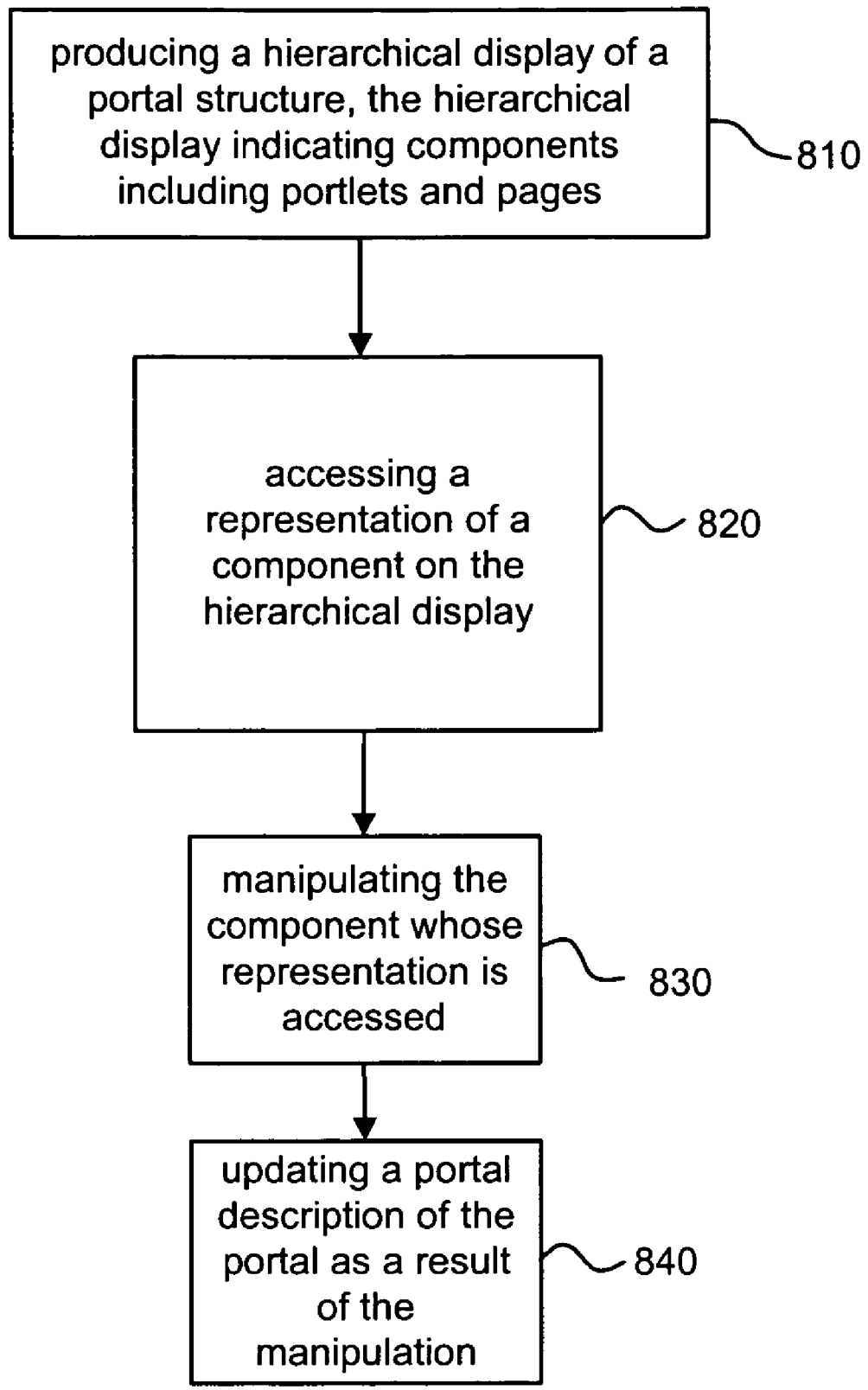
FIG. 8 is a flowchart of a method using a hierarchical display to facilitate the generation of portals in accordance with an embodiment of the present invention.

One embodiment of the present invention concerns the use of a hierarchical display in a graphical user interface for generating a user-configured portal. FIG. 8 is a flowchart of a method using a hierarchical display to facilitate the generation of portals in accordance with an embodiment of the present invention. In step 810, a hierarchical display of a portal structure is produced. The hierarchical display can indicate components including portlets and pages. The hierarchical display can be produced using the current portal XML. In step 820, a representation of a component on the hierarchical display can be accessed. This can be done by clicking on the representation of the component in the hierarchical display. In step 830, the component whose representation is accessed can be manipulated. In step 840, an updated portal file can be produced as a result of the manipulation.

The representations of components in the hierarchical display can be accessed by clicking on the hierarchical display. The hierarchical display can include parent and child nodes, where child nodes can be made visible by clicking on parent nodes. The manipulating can include modifying at least one property of the component. The property can be modified using a property editor display or by dragging and dropping a modification onto the representation. The manipulating can include modifying the position of the component in the hierarchical display. This can be done by dragging and dropping the representation within the hierarchical display or from a design view. The hierarchical display can be part of a graphical user interface for a portal designer. The graphical user interface can further include a design view, and palettes with components to be dragged and dropped. The hierarchical display can be a document structure view. A portal can be constructed in accordance with the portal description.

Portal Components

A desktop is a user view of portal components that includes the portal header, footer, and body. The desktop is the top-level container for the portal components included in that specific view of the portal. The Look & Feel can operate at the desktop level. A Look & Feel can be made up of two parts referenced by a single XML file: skins and skeletons. Skins can contain the graphics, styles, and JavaScript code that determine the look of a desktop. Skeletons can control the physical boundary rendering of all portal components. The different Look & Feels for a desktop can be selectable in the Property Editor Window. Portal administrators and end users can also change a desktop's Look & Feel. Portal administrators can create new desktops.

The header and footer are areas above and below the main body that typically include personalized content, banner graphics, legal notices, and related links. The desktop header and footer display content outside the desktop's books, pages, and portlets (typically above and below). A header/footer combination can be defined by a shell, which is an XML file that points to JSP or HTML files containing the content to display (colors, graphics, personalized content, and so on). The different shells for the desktop are selectable in the Property Editor window. Portal administrators and end users can also change a desktop's shell.

Books are high-level organizational framework and navigation tool for the content and provide a mechanism for nesting pages and other content. The top-level book contains all sub-books, pages, and portlets. The top-level book defines the initial menu navigation style used for the desktop. A different navigation style can be used for each sub-book. Navigation menu styles for books are selectable in the Property Editor Window. Portal administrators and end users can change the navigation style for books. Designers can also apply themes to books. Themes are Look & Feel subsets that can make a book, page or portlet look physically different than the rest of the desktop. Portal administrators and end users can also change themes.

Pages are organized collections of portlets and books whose position is determined by a layout. Pages and sub-books are the navigable containers used for organizing portlets. Different navigation menu styles can be applied to books. Themes can be applied to portlets, pages and books. Portal administrators and end users can change navigation menus and themes. Portal administrators can also create new pages and books.

The layout determines the position of the portlets and books on a page using placeholders within a grid. Placeholders are individual cells in the layout used to organize the portlets on a page. Layouts determine book and portlet positioning on pages. Layouts which can be defined by an XML file, are divided into cells, or placeholders, in which portlets and books are placed. Different layouts for a page can be selectable from a Property Editor window. Portlets can be placed horizontally or vertically relative to each other in a placeholder. Portal administrators and end users can change page layouts. Portlets are windows in which present applications, information, and business processes. Portal Rendering and Look and Feel Components are stylistic aspects of the desktop appearance.

Portlets are the containers that surface Web content and applications in the desktops. Each portlet, can be a single XML file with a portlet extension that references the content or application view it will surface. Using the Portlet Designer and the Property Editor window, portlet preferences can be added and portlet modes (such as edit and help) can be configured that add functionality to the portlets, all of which can be included in the portlet XML file. Portlets can be reused multiple times by creating new instances of the portlet. The content of each portlet instance can be automatically updated if the source portlet file changes, but each instance of a portlet can be configured in unique ways (such as changing the titlebar label). Portal developers, administrators, and end users can apply themes to portlets.

Portal component can be selected in the Portal Designer, and properties for the portal component can be selected in the Property Editor window. Most portal configuration in the development environment can occur in the Property Editor window. Changes can be automatically written to the portal or portlet XML file. Portlets can be created using a Portlet Designer. The portlet designer can allow for the graphical construction of portlets by selecting or dragging and dropping features, such as enabling portlet deletion, maximize/minimize functionality, help mode and the like.

The Document Structure window in the Portal Designer shows the parent/child relationships among portal components as they appear in the underlying portal XML file, also shown in the figure. The XML can be built automatically as the user operates in the Portal Designer. FIG. 6 illustrates an example of portal XML for a section of a Document Structure window. The XML contains configuration attributes for the portal elements.

The Portal Designer can be used to assemble portal elements into a portal, and to add programmatic functionality to portlets and to Create, Edit, Delete, and Save portal elements such as Books, Pages and Portlets.

Within the Design View, placeholders can be clicked on to insert or remove portlets, rearrange portlets and view a simple mock-up of the portal being designed. The Application window exposes the construction of the Web application that contains the portal(s), and all the JSPs and other elements used to customize and add functionality. These can include Java Page flows used to apply complex navigation to portlets. The PortalUI Controls include Books, Pages and Portlets that can be dragged onto a placeholder. Dynamic content can be previewed using the Content Preview palette.

Build results and debugger messages can be viewed. A Property Set Designer can be used to set properties on any selected portal element. The Document Structure palette can be used to determine the hierarchical location of files within the portal desktop being edited. The Content Preview palette can be used to review the results of content queries against the current document repository. The Data Palette can expose the list of currently available portlets that can be inserted into the current portal in design view. In one embodiment, a number of designers can be invoked from the Portal Designer such as a Property Set Designer (Use to edit Session Requests, Events, Catalog Structure objects.), a User Segment Designer, a Portal Placeholder Designer, a Campaign Designer, a Discount Designer and a Content Selector Designer.

Administration Tool and Local Tools

Portal administration can involve portal aggregation and management using a Administration Portal. Portal administrators can use the resources created by developers to assemble and modify portals and prepare them for production. As shown in FIG. 1, an administration web application 147 can be deployed in the business platform 130 and accessed by an administrator. In one embodiment, a primary copy of the portal XML produced by the portal designer is obtained from the file system. A new portal XML representation is created for each new version of the portal created using an administration tool or local tool.

An administrator can, for example, use development-created resources such as desktops, pages, and portlets to construct a new portal. Administrators can also create new portals and portal resources such as desktops, books, pages, and portlets. A component-based framework allows administrators to set up delegated administration and define visitor entitlements that determine which users can administer and view specific portal components and content. Administrators also add and manage the users that developers will target with their applications.

Portal administration can also involve other important tasks necessary to support the development environment. For example, an administrator can configure content repositories in a Virtual Content Repository so that a developer can construct a query for a content selector, placeholder, or campaign.

Figure 9:
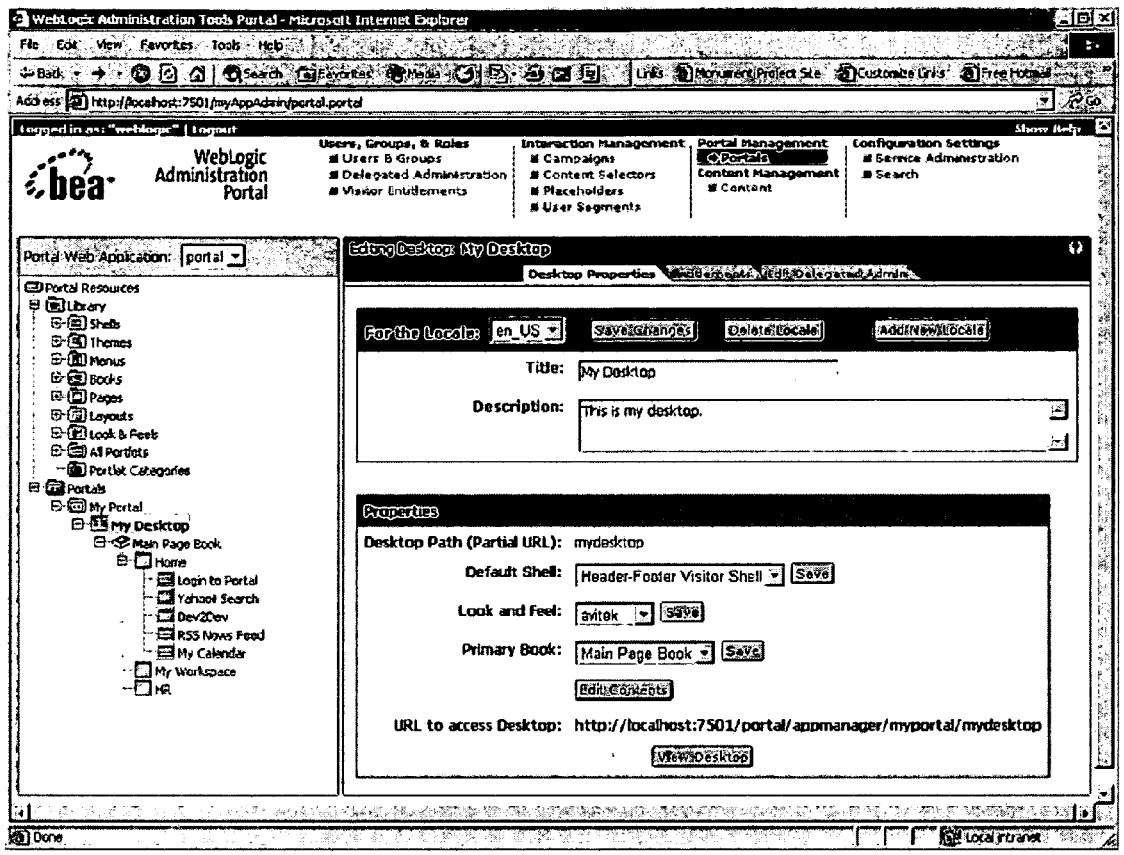
FIG. 9 illustrates an administration portal.

FIG. 9 shows an exemplary Administration portal. Notice that the desktop structure in the left resource tree matches that of the structure created in the Portal Designer, as shown in the Document Structure window of FIG. 5B.

In addition to administration tools, user tools can be used. The user tools can allow users or sub-administrators to modify the portals similar to the administrative portal. The administrative portal can select what elements of the portal can be modified by the user or sub-administrator. The user or sub-administrator can then set up the portal to their liking within the limits set by the administrator. The administration and user tools can have any or all of the functionality of the portlet designer.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nan systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method for generating a portal, comprising:
providing a first development environment having a plurality of portal designer tools capable of simultaneously obtaining portal configuration information;
providing a second development environment having an administration tool to construct a portal for a particular user or group of users
wherein the plurality of portal designer tools in the first development environment and the administration tool in the second development environment, communicate via a network, and
wherein each one of the portal designer tools includes a graphical user interface that obtains the portal configuration information by dragging and dropping a portal component from a palette to a display within the graphical user interface, and wherein the portal component includes one of a portlet, page and book;
receiving, by the administration tool, the portal configuration from each one of the plurality of portal designer tools via the network, and preparing a portal description in accordance with the portal configuration information received;
wherein the administration tool aggregates the portal configuration information received from the plurality of portal designer tools located in the first development environment to construct the portal for the particular user or group of users;
providing a design view, a source view and a hierarchical view as part of the graphical user interface, wherein the design view is a display that gives a graphical indication of the portal components in the portal, the source view is a display of the portal description and the hierarchical view provides a graphical indication of all the portal components arranged in a hierarchy;
detecting a modification of the portal description by any of the design tools, wherein the modification is detected by detecting at least one of a drag and drop by one of the plurality of design tools of a new portal component from the palette into the display within the graphical user interface, and editing properties of the selected portal component; and
automatically synchronizing the portal description, design view, source view and hierarchical view across the portal designer tools and the administration tool, via the network, to reflect the modification of the portal description, wherein upon detecting the modification of the portal description, the design view, source view and hierarchical view of each one of the plurality of design tools are updated to reflect the modification.

2. The method of claim 1, wherein a property editor window is used to change a look and feel of the portal component.

3. The method of claim 1, wherein a property editor window is used to change a theme of the portal component.

4. The method of claim 1, wherein a property editor window is used to change a title of the portal component.

5. The method of claim 1, wherein the portal description is a portal file.

6. The method of claim 1, wherein the portal configuration information is stored in a database.

7. The method of claim 1, wherein the graphical user interface is part of the portal designer.

8. The method of claim 1, wherein the graphical user interface is part of the administration tool.

9. The method of claim 1 wherein a representation of portal components in the hierarchical display are accessed by clicking on the hierarchical display.

10. The method of claim 1, wherein the portal component is a portlet.

11. The method of claim 1, wherein the portal component is a page.

12. The method of claim 1, further comprising:
deploying the portal.

13. A computer readable storage medium storing one or more sequences of instructions, said instructions, when executed by one or more processors, causing the one or more processors to perform the steps of:
providing a first development environment having a plurality of portal designer tools capable of simultaneously obtaining portal configuration information;
providing a second development environment having an administration tool to construct a portal for a particular user or group of users
wherein the plurality of portal designer tools in the first development environment and the administration tool in the second development environment, communicate via a network, and
wherein each one of the portal designer tools includes a graphical user interface that obtains the portal configuration information by dragging and dropping a portal component from a palette to a display within the graphical user interface, and wherein the portal component includes one of a portlet, page and book;
receiving, by the administration tool, the portal configuration from each one of the plurality of portal designer tools via the network, and preparing a portal description in accordance with the portal configuration information received;
wherein the administration tool aggregates the portal configuration information received from the plurality of portal designer tools located in the first development environment to construct the portal for the particular user or group of users;
providing a design view, a source view and a hierarchical view as part of the graphical user interface, wherein the design view is a display that gives a graphical indication of the portal components in the portal, the source view is a display of the portal description and the hierarchical view provides a graphical indication of all the portal components arranged in a hierarchy;
detecting a modification of the portal description by any of the design tools, wherein the modification is detected by detecting at least one of a drag and drop by one of the plurality of design tools of a new portal component from the palette into the display within the graphical user interface, and upon editing properties of the selected portal component; and
automatically synchronizing the portal description, design view, source view and hierarchical view across the portal designer tools and the administration tool, via the network, to reflect the modification of the portal description, wherein upon detecting the modification of the portal description, the design view, source view and hierarchical view of each one of the plurality of design tools are updated to reflect the modification.

14. The computer readable storage medium of claim 13, wherein a property editor window is used to change a look and feel of the portal component.

15. The computer readable storage medium of claim 13, wherein a property editor window is used to change a theme of the portal component.

16. The computer readable storage medium of claim 13, wherein a property editor window is used to change a title of the portal component.

17. The computer readable storage medium of claim 13, wherein the portal description is a portal file.

18. The computer readable storage medium of claim 13, wherein the portal configuration information is stored in a database.

19. The computer readable storage medium of claim 13, wherein the graphical user interface is part of the portal designer.

20. The computer readable storage medium of claim 13, wherein the graphical user interface is part of the administration tool.

21. The computer readable storage medium of claim 13 wherein a representation of components in the hierarchical display are accessed by clicking on the hierarchical display.

22. The computer readable storage medium of claim 13, wherein the portal component is a portlet.

23. The computer readable storage medium of claim 13, wherein the portal component is a page.

24. The computer readable storage medium of claim 13, further comprising:
deploying the portal.

25. A system for generating a user-configured portal, comprising:
a server including one or more processors, said server configured to automatically synchronize data;
a plurality of portal designer tools deployed in a first development environment capable of simultaneously obtaining portal configuration information;
an administration tool deployed in a second development environment capable of constructing a portal for a particular user or group of users;
wherein each one of the portal designer tools includes a graphical user interface that obtains the portal configuration information by dragging and dropping a portal component from a palette to a display within the graphical user interface, and wherein the portal component includes one of a portlet, page and book;
wherein the graphical user interface includes a design view, a source view and a hierarchical view, and wherein the design view is a display that gives a graphical indication of the portal components in the portal, the source view is a display of the portal description and the hierarchical view provides a graphical indication of all the portal components arranged in a hierarchy;
wherein the administration tool aggregates the portal configuration information received from the plurality of portal designer tools located in the first development environment to construct the portal for the particular user or group of users;
whereupon when the server detects a modification of the portal description by any of the design tools by detecting at least one of a drag and drop of a new portal component from the palette into the display within the graphical user interface, and editing properties of the selected portal component, the server automatically synchronizes the portal description, design view, source view and hierarchical view across the portal designer tool and the administration tool, via the network, to reflect the modification of the portal description, and wherein upon detecting the modification of the portal description, the design view, source view and hierarchical view are updated to reflect the modification.

26. The system of claim 25, wherein a property editor window is used to change a look and feel of the portal component.

27. The system of claim 25, wherein a property editor window is used to change a theme of the portal component.

28. The system of claim 25, wherein a property editor window is used to change a title of the portal component.

29. The system of claim 25, wherein the portal description is a portal file.

30. The system of claim 25, wherein the portal configuration information is stored in a database.

31. The system of claim 25, wherein the graphical user interface is part of the portal designer.

32. The system of claim 25, wherein the graphical user interface is part of the administration tool.

33. The system of claim 25, wherein a representation of portal components in the hierarchical display are accessed by clicking on the hierarchical display.

34. The system of claim 25, wherein the portal component is a portlet.

35. The system of claim 25, wherein the portal component is a page.

36. The system of claim 25, further comprising: deploying the portal.

37. The method of claim 1, wherein the configuration information includes position information for a component, wherein the position a portlet is dropped in a design view relates to the position the portlet will be in a displayed page.

38. The method of claim 1, wherein the administrator tool configures a virtual content repository, wherein a developer can construct a query for a content selector, placeholder, or campaign using the virtual content repository.

39. The method of claim 1, wherein the portal component is modified by dragging and dropping a modification onto the portal component.

40. The method of claim 1, wherein the representations of components in the hierarchical display are accessed by clicking on the hierarchical display.

41. The method of claim 1, wherein child nodes are made visible by clicking on parent nodes.

42. The method of claim 1, wherein the modifying includes changing at least one property of the portal component.

43. The method of claim 1, wherein the modifying includes changing a position of the portal component in the hierarchical display.

44. The method of claim 1, wherein the modifying includes dragging and dropping a representation of a portal component.

45. The method of claim 1, wherein placement of the portal component on the display determines the position of the portal component on the portal.

46. The method of claim 1, further comprising:
providing a portlet designer to graphically construct portlets for use in the portal, wherein constructed portlets are stored in a content repository and searchable by the plurality of portal designer tools.

* * * * *

UNITED STATES PATENT AND TRADEMARK OFFICE
CERTIFICATE OF CORRECTION

| | | |
|---|---|---|
| PATENT NO. | : 7,890,877 B2 | Page 1 of 1 |
| APPLICATION NO. | : 10/788247 | |
| DATED | : February 15, 2011 | |
| INVENTOR(S) | : Ritchy et al. | |

It is certified that error appears in the above-identified patent and that said Letters Patent is hereby corrected as shown below:

On sheet 3 of 9, in figure 3B, Reference Numeral 360, line 10, delete "dislayed" and insert -- displayed --, therefor.

In column 2, line 4, delete "is are" and insert -- are --, therefor.

In column 6, line 16, delete "lay out" and insert -- layout --, therefor.

Signed and Sealed this
Fourth Day of October, 2011

David J. Kappos
*Director of the United States Patent and Trademark Office*